US011459905B2

United States Patent
Stevens et al.

(10) Patent No.: US 11,459,905 B2
(45) Date of Patent: Oct. 4, 2022

(54) DUCT WITH ADDITIVE MANUFACTURED SEAL

(71) Applicant: United Technologies Corporation, Farmington, CT (US)

(72) Inventors: Michael S. Stevens, Alfred, ME (US); Jeffrey Vincent Anastas, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 484 days.

(21) Appl. No.: 16/665,500

(22) Filed: Oct. 28, 2019

(65) Prior Publication Data

US 2020/0063594 A1 Feb. 27, 2020

Related U.S. Application Data

(62) Division of application No. 14/867,850, filed on Sep. 28, 2015, now abandoned.

(51) Int. Cl.
| | |
|---|---|
| *B23P 15/00* | (2006.01) |
| *B28B 1/00* | (2006.01) |
| *B33Y 10/00* | (2015.01) |
| *B33Y 40/20* | (2020.01) |
| *B22F 5/00* | (2006.01) |
| *F01D 11/00* | (2006.01) |
| *F01D 11/12* | (2006.01) |

(Continued)

(52) U.S. Cl.
CPC ............ *F01D 11/122* (2013.01); *B22F 5/009* (2013.01); *B22F 10/20* (2021.01); *B23P 15/00* (2013.01); *B33Y 40/20* (2020.01); *F01D 11/001* (2013.01); *B28B 1/001* (2013.01); *B33Y 10/00* (2014.12); *B33Y 80/00* (2014.12); *F01D 11/127* (2013.01); *F05D 2230/22* (2013.01); *F05D 2250/283* (2013.01); *Y02P 10/25* (2015.11)

(58) Field of Classification Search
None
See application file for complete search history.

(56) References Cited

U.S. PATENT DOCUMENTS

| | | |
|---|---|---|
| 3,423,070 A | 1/1969 | Corrigan |
| 4,135,851 A | 1/1979 | Bill et al. |
| 4,822,244 A | 4/1989 | Maier et al. |

(Continued)

FOREIGN PATENT DOCUMENTS

| | | |
|---|---|---|
| CN | 103722171 A | 4/2014 |
| CN | 104043831 A | 9/2014 |

(Continued)

OTHER PUBLICATIONS

Extended European Search Report, for European Patent Application No. 16191129.2, dated Jan. 21, 2017, 17 pages.

(Continued)

*Primary Examiner* — Jacob J Cigna
(74) *Attorney, Agent, or Firm* — Kinney & Lange, P.A.

(57) ABSTRACT

A method of making a component includes creating a computer file defining the component in layers, the component including: a body including a sealing portion; and an abradable seal extending from the sealing portion; and building the component using an additive manufacturing process that builds the component on a layer-by-layer basis such that the abradable seal is integral to the body.

9 Claims, 7 Drawing Sheets

(51) Int. Cl.
*B22F 10/20* (2021.01)
*B33Y 80/00* (2015.01)

(56) References Cited

U.S. PATENT DOCUMENTS

| | | |
|---|---|---|
| 6,183,193 B1 | 2/2001 | Glasspoole et al. |
| 7,138,002 B2 | 11/2006 | Hamanaka et al. |
| 7,871,578 B2 | 1/2011 | Schmidt |
| 8,230,687 B2 | 7/2012 | Ziminsky |
| 8,393,381 B2 | 3/2013 | Graham et al. |
| 8,668,442 B2 | 3/2014 | Morris et al. |
| 8,691,333 B2 | 4/2014 | Godfrey et al. |
| 9,023,765 B1 | 5/2015 | Rimmer et al. |
| 9,920,645 B2 * | 3/2018 | Mahle .................. F01D 5/225 |
| 10,184,346 B2 * | 1/2019 | Wulf .................. B23K 15/0086 |
| 2001/0004436 A1 | 6/2001 | Chasripoor et al. |
| 2002/0172591 A1 | 11/2002 | Glynn et al. |
| 2004/0048027 A1 | 3/2004 | Hayes et al. |
| 2005/0186389 A1 | 8/2005 | Aoki |
| 2008/0041064 A1 | 2/2008 | Moore et al. |
| 2008/0044284 A1 * | 2/2008 | Alvanos .............. F01D 5/3007 416/193 A |
| 2009/0072488 A1 | 3/2009 | Ramerth et al. |
| 2010/0029189 A1 | 2/2010 | Wood |
| 2013/0189086 A1 | 7/2013 | Bayer et al. |
| 2013/0243675 A1 | 9/2013 | Halder et al. |
| 2013/0280049 A1 | 10/2013 | Fisk et al. |
| 2013/0316183 A1 | 11/2013 | Kulkarni, Jr. et al. |
| 2014/0044528 A1 | 2/2014 | Clouse |
| 2014/0079540 A1 | 3/2014 | Morris et al. |
| 2014/0161601 A1 | 6/2014 | Geiger |
| 2014/0199175 A1 | 7/2014 | Godfrey et al. |
| 2014/0321998 A1 | 10/2014 | Maar et al. |
| 2015/0003970 A1 | 1/2015 | Feldmann et al. |
| 2015/0060131 A1 | 3/2015 | Coppola |
| 2015/0071769 A1 | 3/2015 | Gieg et al. |
| 2015/0096266 A1 | 4/2015 | Divine et al. |
| 2015/0275690 A1 | 10/2015 | McCaffrey |
| 2016/0319690 A1 * | 11/2016 | Lin ...................... B22F 3/1115 |
| 2018/0105690 A1 | 4/2018 | Kaneko et al. |

FOREIGN PATENT DOCUMENTS

| | | | |
|---|---|---|---|
| CN | 104045149 A | 9/2014 | |
| CN | 104057616 A | 9/2014 | |
| CN | 2859329 A1 | 3/2015 | |
| CN | 204239323 U | 4/2015 | |
| EP | 1077338 A2 | 2/2001 | |
| EP | 1645723 A1 | 4/2006 | |
| EP | 2055895 A2 | 5/2009 | |
| EP | 2738359 A1 | 6/2014 | |
| EP | 2899405 A1 | 7/2015 | |
| WO | WO-2005049312 A1 * | 6/2005 | ............ F01D 11/122 |
| WO | WO2014/137890 A1 | 9/2014 | |
| WO | WO2015/006445 A1 | 1/2015 | |
| WO | WO2015/006471 A1 | 1/2015 | |
| WO | WO2015/034636 A1 | 3/2015 | |
| WO | WO2015/042089 A1 | 3/2015 | |
| WO | WO2015/050706 A1 | 4/2015 | |
| WO | WO2015/053940 A1 | 4/2015 | |
| WO | WO2015/053941 A1 | 4/2015 | |

OTHER PUBLICATIONS

Communication Pursuant to Article 94(3) EPC for European Application No. 16191129.2, dated Jun. 12, 2019, 7 pages.

* cited by examiner

DUCT WITH ADDITIVE MANUFACTURED SEAL

CROSS-REFERENCE TO RELATED APPLICATION(S)

This application is a divisional of U.S. application Ser. No. 14/867,850 filed Sep. 28, 2015 for "DUCT WITH ADDITIVE MANUFACTURED SEAL" by M. Stevens and J. Anastas.

BACKGROUND

The present invention relates generally to abradable seals, and more particularly to a sealing arrangement of a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

The high energy gases contain a substantial amount of thermal energy, which is transferred to the high and low pressure turbines. Therefore, the high and low pressure turbines are cooled using air that is bled from the low and/or high pressure compressors. This air can be passed through a tangential on-board injector which directs the air towards the first stage rotor of the high pressure turbine. In order to prevent leaking of cooling air as it is passed from the tangential on-board injector (which is stationary) to the rotor (which is rotating), knife edge seals are employed on one of the components. The knife edges are paired with an abradable seal on the corresponding component. The abradable portion of such a sealing arrangement can be a fragile structure that is brazed onto the tangential on-board injector (TOBI). Brazing an abradable seal onto another component may incur certain costs, such as the time it takes to manufacture or the risk that the seal will be damaged after installation.

SUMMARY

According to one embodiment of the present invention, a method of making a component includes creating a computer file defining the component in layers, the component including: a body including a sealing portion; and an abradable seal extending from the sealing portion; and building the component using an additive manufacturing process that builds the component on a layer-by-layer basis such that the abradable seal is integral to the body.

According to another embodiment, a monolithic component has a first end and a second end and includes: a body including a sealing portion; and an abradable seal integral to and extending from the sealing portion; the component being made by the steps of: selectively sintering a first layer of pulverulent material within a frame to make a partially built component; lowering the partially built component; adding a second layer of pulverulent material on top of the partially built component; and selectively sintering the second layer of pulverulent material to the partially built component.

According to another embodiment, a component includes: a body including a sealing portion; and an abradable seal extending from the sealing portion, the abradable seal having a plurality of walls; wherein the abradable seal is comprised of the same material as the body and is integral to the body; and wherein each joint between each of the plurality of walls and the body is uniform.

DETAILED DESCRIPTION

Figure 1:
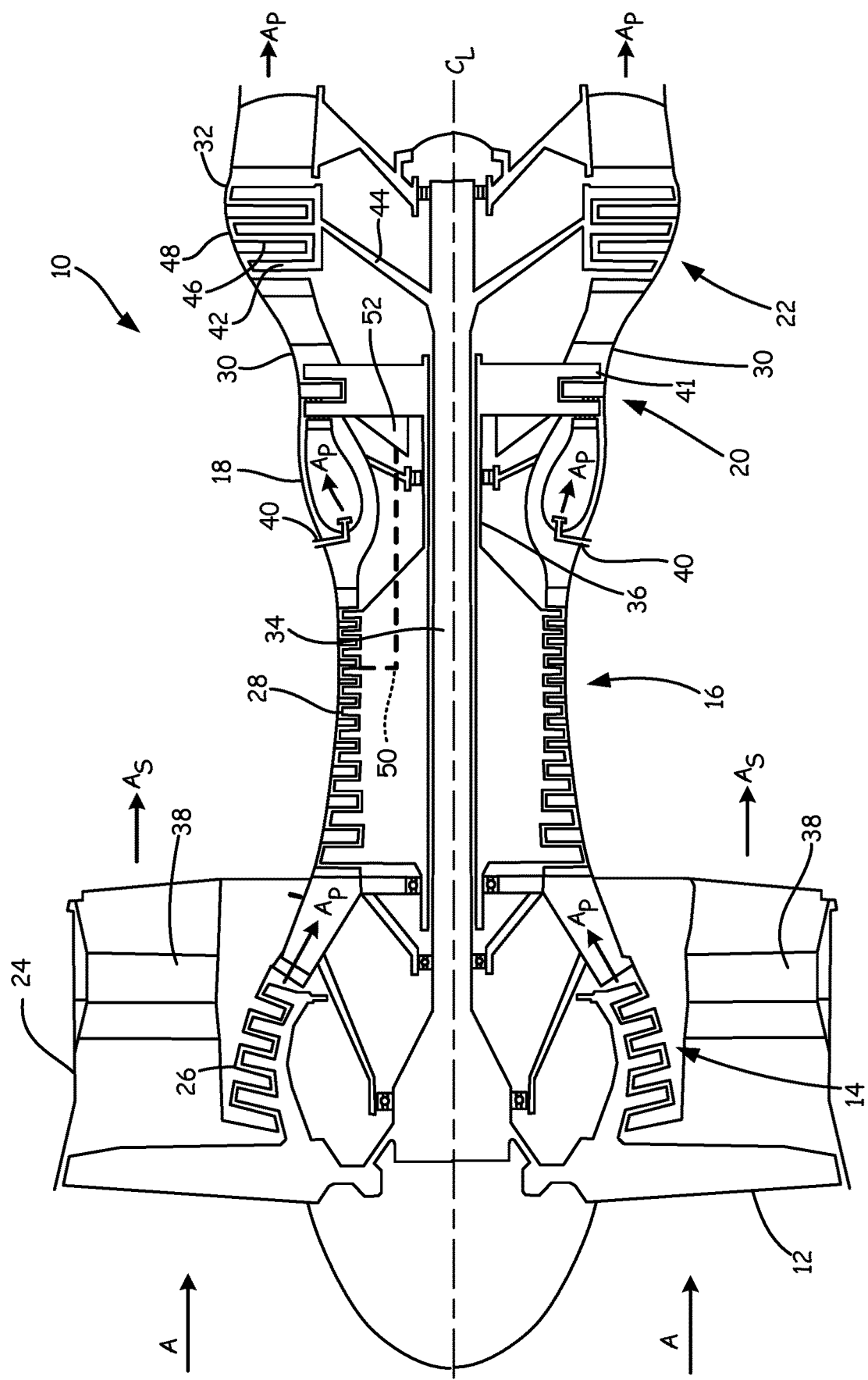
FIG. 1 is a schematic side cross-section view of a gas turbine engine.

FIG. 1 is a schematic side cross-section view of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, exit guide vanes 38, injectors 40, HPT blades 41, LPT blades 42, support rotor 44, vane airfoil sections 46, case section 48, gas path 50, tangential on-board injector (TOBI) 52, inlet air A, primary air $A_P$, secondary air $A_S$ (also known as bypass air), and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally step up the pressure of primary air $A_P$. HPC 16 is rotated by HPT 20 through low pressure shaft 34 to provide compressed air to combustor section 18. The compressed air is delivered to combustor section 18, along with fuel through injectors 40, such that a combustion process can be carried out to produce the high energy gases necessary to turn HPT 20 and LPT 22. Primary air $A_P$ continues through gas turbine engine 10 whereby it is typically passed through an exhaust nozzle to further produce thrust.

After being compressed in LPC 14 and HPC 16 and participating in a combustion process in combustor section 18 to increase pressure and energy, primary air $A_P$ flows through HPT 20 and LPT 22 such that HPT blades 41 and LPT blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns fan 12 and LPC 14.

Figure 2:
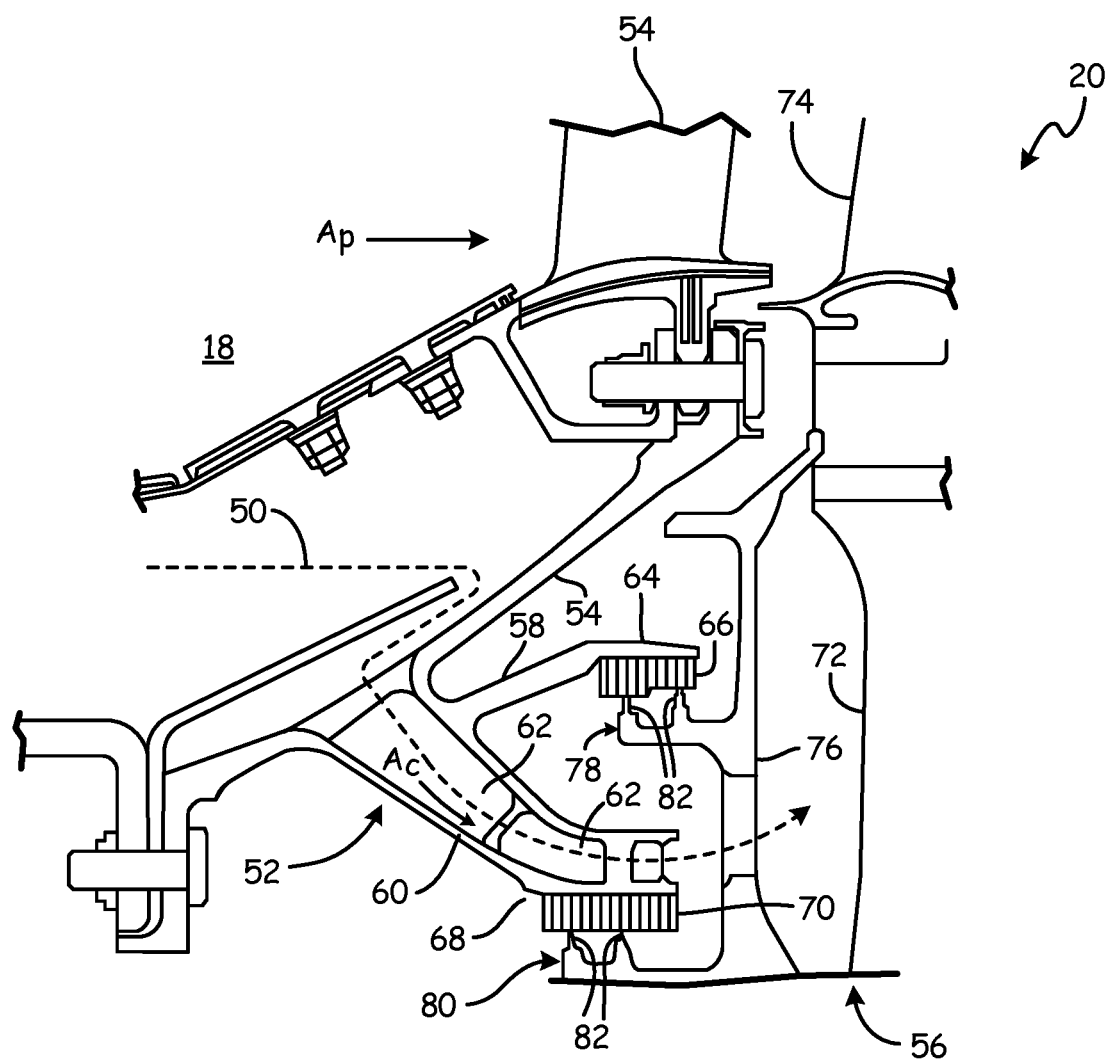
FIG. 2 is a cross-sectional view of a high pressure turbine including an additive manufactured tangential on-board injector.

In addition, a portion of primary air $A_P$ can be bled off from at least one of LPC 14, HPC 16, and in between LPC 14 and HPC 16 for use as cooling air $A_C$ (shown in FIG. 2). Cooling air $A_C$ is used for cooling components of HPT 20 and LPT 22, including the first stage rotor of HPT 20, so the air travels through gas path 50 into TOBI 52. TOBI 52 is a stationary duct through which cooling air $A_C$ is directed towards HPT 20.

The components and configuration of gas turbine engine 10 as shown in FIG. 1 allow for a portion of primary air $A_P$ upstream of combustor section 18 to be transported downstream of combustor section 18 and through TOBI 52. Because this air is relatively cool (having not gone through combustor section 18), the air can be used to cool components such as HPT 20 and LPT 22. This is advantageous because the temperatures of the components in HPT 20 and LPT 22 would rise to excessively high levels if left unchecked.

Depicted in FIG. 1 is one embodiment of the present invention, to which there are alternative embodiments. For example, engine 10 can be a three spool engine. In such an embodiment, engine 10 has an intermediate compressor between LPC 14 and HPC 16 and an intermediate turbine between HPT 20 and LPT 22, wherein the intermediate compressor is connected to the intermediate turbine with an additional shaft.

FIG. 2 is a cross-sectional view of HPT 20 including an additive manufactured TOBI 52. Depicted in FIG. 2 are combustor section 18, HPT 20, gas path 50, TOBI 52, first stage stator 54, and first stage rotor 56. In the illustrated embodiment, TOBI 52 is a unitary, monolithic body comprised of a single material or alloy with several integral structures, such as sealing arm 58 and conduit 60. Conduit 60 includes a plurality of angled vanes 62 that direct cooling air $A_c$ from gas path 50 towards first stage rotor 56 at an angle that is oriented, in part, tangentially to the circumference of first stage rotor 56. Sealing arm 58 integrally includes sealing portion 64 from which outer abradable seal 66 extends radially inwardly, and conduit 60 includes sealing portion 68 from which inner abradable seal 70 extends radially inwardly.

First stage rotor 56 includes disk 72 with a plurality of airfoils 74 extending from the outer edge of disk 72 (although only one airfoil 74 is visible in FIG. 2). In addition, seal plate 76 is attached to the upstream side of disk 72, and seal plate 76 includes outer knife edge seal 78 and inner knife edge seal 80. In the illustrated embodiment, two knives 82 extend radially outwardly from and circumferentially around each of knife edge seals 78, 80. Each of knife edge seals 78, 80 is configured to seal against the corresponding abradable seal 66, 70 by way of knives 82 interacting with abradable seals 66, 70. Such a sealing arrangement with an abradable component (i.e., one of abradable seals 66, 70) and a contacting component (i.e., at least one of knives 82) is shown in greater detail in FIG. 4.

During operation of gas turbine engine 10 (shown in FIG. 1), first stage rotor 56 rotates as energy is extracted from primary air $A_P$. Because of the thermal energy in primary air $A_P$ at this point, cooling air $A_C$ is ejected from TOBI 52 towards first stage rotor 56. First stage rotor 56 includes internal passageways (not shown) that allow for cooling air $A_c$ to reach airfoils 74 for thermal management purposes.

The components and configuration of HPT 20 as shown in FIG. 2 allow for cooling air $A_c$ to be directed at first stage rotor 56 while inhibiting leakage of cooling air $A_C$ either radially inward or radially outward from its intended flowpath. Such sealing is accomplished while allowing relative rotation between first stage rotor 56 and TOBI 52.

Depicted in FIG. 2 is one embodiment of the present invention, to which there are alternative embodiments. For example, knife edge seals 78, 80 can include greater or fewer than two knives 82 each.

Figure 3A:
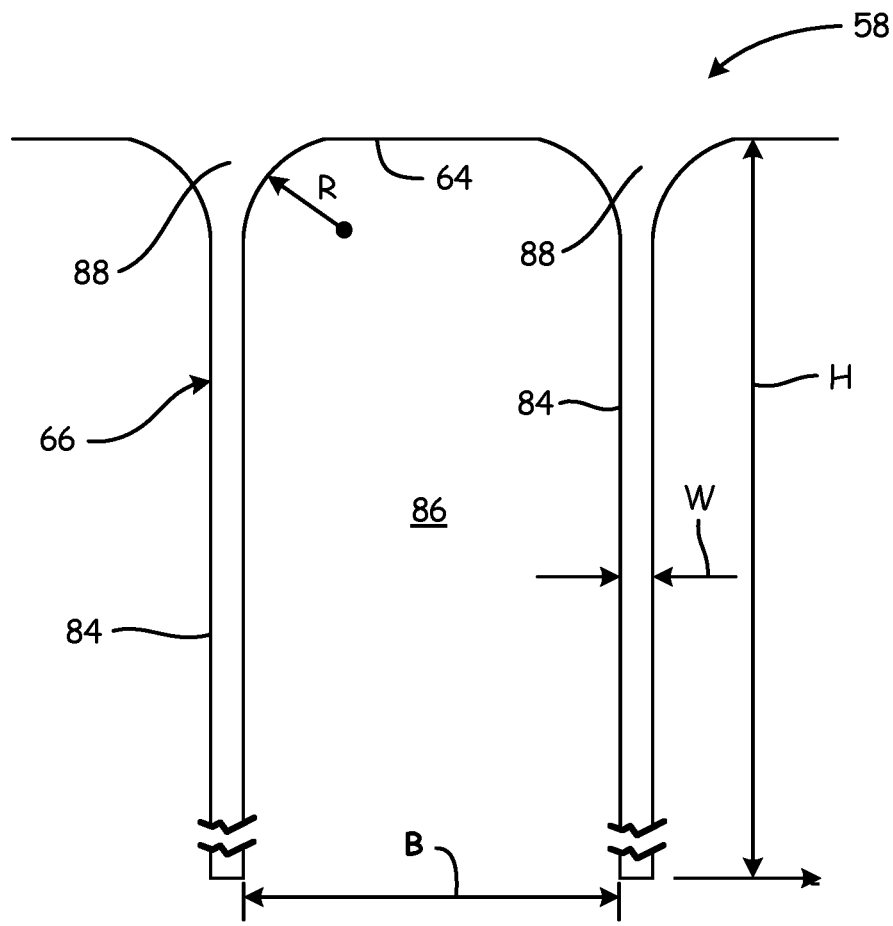
FIG. 3A is a cross-sectional view of an abradable seal.
Figure 3B:
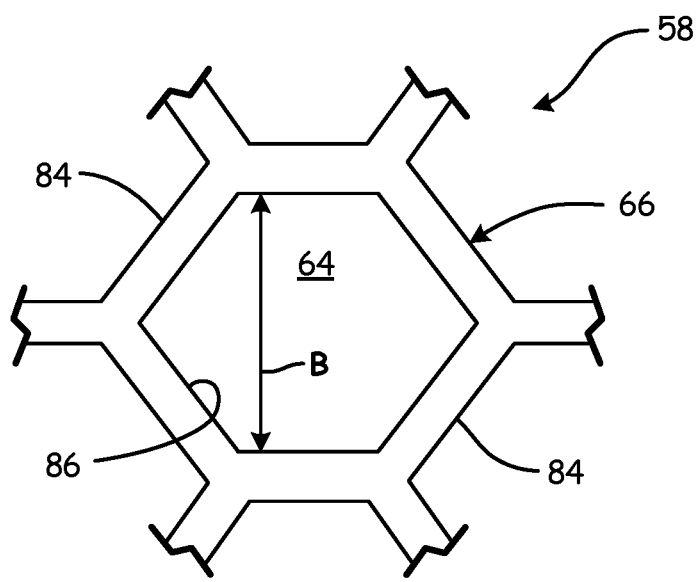
FIG. 3B is a bottom view of the abradable seal.

FIG. 3A is a cross-sectional view of outer abradable seal 66, and FIG. 3B is a bottom view of outer abradable seal 66. These two figures will now be discussed simultaneously. In addition, for the present intents and purposes, inner abradable seal 70 has substantially the same configuration as outer abradable seal 66.

As stated previously, outer abradable seal 66 is integral to and extends from sealing portion 64 of sealing arm 58. Outer abradable seal 66 is comprised of a plurality of walls 84 that are arranged to form a plurality of hexagonal cells 86 (although only one cell 86 is visible in FIGS. 3A-3B) that are closed on seven sides (because each cell 86 is bordered by six walls 84 and sealing portion 64). Due to the shape of cells 86, outer abradable seal 66 can be called a "honeycomb" seal.

Each of the plurality of walls 84 joins sealing portion 64 at a joint 88. Every joint 88 is substantially uniform and each joint 88 has a double-sided, radiused shape (i.e., each joint 88 is filleted). More specifically, each side of joint 88 has a fillet with radius of curvature R. Such a configuration is unlike an abradable seal that has been brazed onto another component for at least two reasons. First, the ends of the walls of a traditional honeycomb seal are straight and do not include any fillets. Second, the brazing material varies the shape of the joints between the honeycomb seal and the TOBI without any regularity. This is because the brazing flux is a paste that does not lend itself to being applied uniformly and has a tendency to flow when heated (which is required to complete the brazing process). Therefore, brazing material can be wicked into some of the cells due to the capillary effect and/or gravity, while other cells remain void. This leaves a random pattern of joints wherein each joint has a different shape. In addition, a cell that has been filled with brazing material is much stronger than an empty cell, which poses the risk of damaging the corresponding knife. Another difference of the configuration shown in FIGS. 3A-3B is that joints 88 are integral to both sealing portion 64 and walls 84, respectively, and are not merely adhered together at their exterior surfaces. Furthermore, joints 88 are comprised of the same material(s) as sealing portion 64 and walls 84 (unlike a situation where brazing material is used).

For reference, the dimensions of the illustrated embodiment of FIGS. 3A-3B can be enumerated. Width W of each wall 84 can be between 0.025 mm (0.001 in.) and 0.13 mm (0.005 in.). Seal height H of each wall 84 can be between 0.76 mm (0.030 in.) and 6.4 mm (0.25 in.) and is usually 3.8 mm (0.15 in.). Breadth B of each cell 86 is approximately 0.79 mm (0.031 in.). The maximum value of radius of curvature R is half of breadth B. The axial length of outer abradable seal 66 (visible in FIG. 2 but not labeled) can be 20 mm (0.800 in.) with a diameter between 15 cm (6 in.) and 76 cm (30 in.). While seal height H can be a constant value across the length of an abradable seal (e.g., inner abradable 70 in FIG. 2), seal height H can also vary in a step-like manner (e.g., outer abradable seal 66 in FIG. 2) or in a semi-continuous manner (e.g., outer abradable seal 66' in FIG. 5).

The components and configuration of sealing arm 58 as shown in FIGS. 3A-3B allow for knives 82 (shown in FIG. 2) to penetrate into outer abradable seal 66 without being destroyed or destroying the entirety of outer abradable seal 66. Instead, outer abradable seal 66 is locally deformed, as shown in FIG. 4, but generally remains intact.

Depicted in FIGS. 3A-3B is one embodiment of the present invention, to which there are alternative embodiments. For example, an abradable seal similar to outer abradable seal 66 can be employed in many other locations in gas turbine engine 10 (shown in FIG. 1) where a seal is utilized between two relatively moving parts. One example of such a location is at the tip ends of the low pressure turbine airfoils. Another example is around the low pressure compressor hub.

Figure 4:
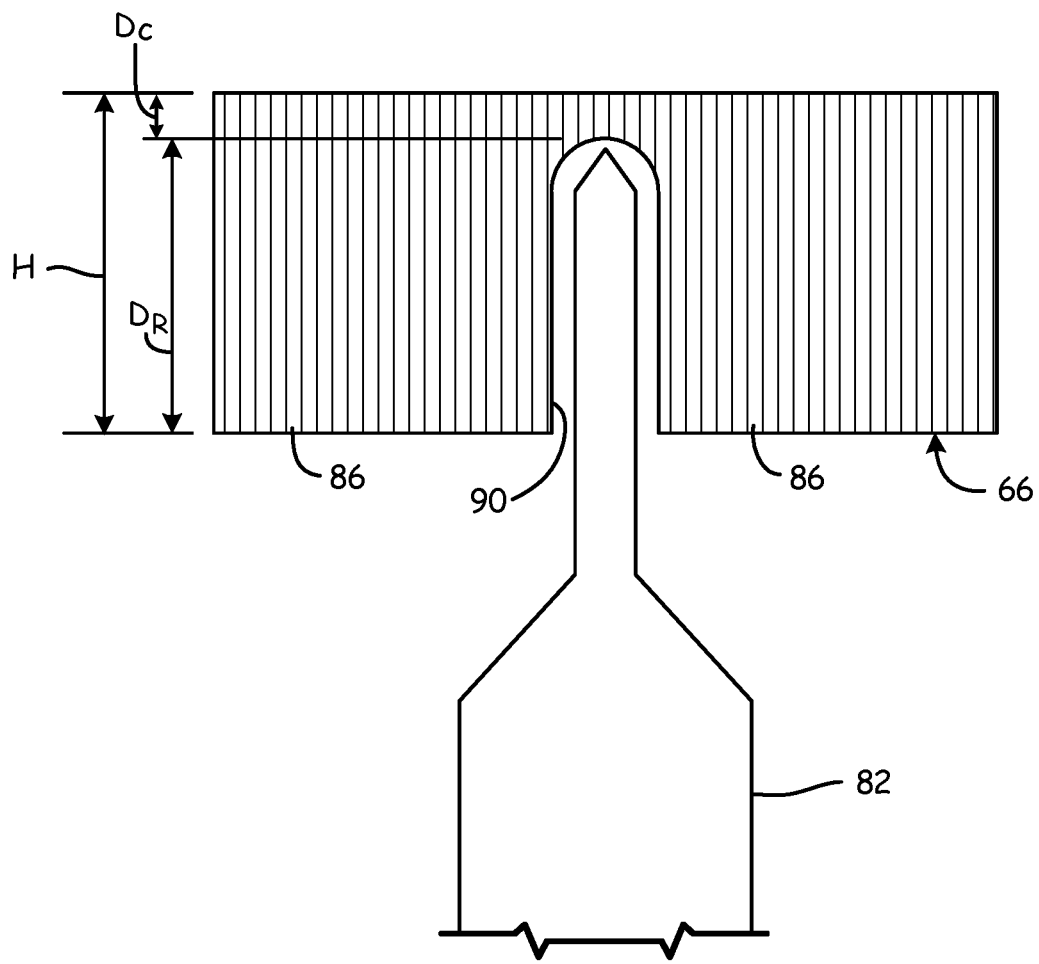
FIG. 4 is a cross-sectional view of a sealing arrangement including the abradable seal.

FIG. 4 is a cross-sectional view of a sealing arrangement including outer abradable seal 66 and knife 82. In addition, for the present intents and purposes, inner abradable seal 70 has substantially the same configuration as outer abradable seal 66, and all of knives 82 interact with their respective seal in substantially the same way.

As stated previously, knife 82 interacts with outer abradable seal 66 to seal cooling air $A_c$ (shown in FIG. 2). More specifically, outer abradable seal 66 and knife 82 have a close clearance fit when gas turbine engine 10 (shown in FIG. 1) is at rest. When gas turbine engine 10 is operated, first stage rotor 56 (shown in FIG. 2) temporarily expands due to thermal and centrifugal forces. The expansion of first stage rotor 56 causes knife 82 to penetrate into outer abradable seal 66. Thereby, knife 82 forms pathway 90 in outer abradable seal 66. Because pathway 90 is substantially parallel to cells 86, only a limited number of cells 86 are affected by knife 82. Therefore, any of cooling air $A_C$ that may be passing through the sealing arrangement must pass between pathway 90 and knife 82, which is a narrow and tortuous path that is detrimental to leakage airflow.

The dimensions of pathway 90 reflect the size of the tip of knife 82 plus the circumferential dimensional tolerances and elastic deformation that occurs during operation. The result is that knife 82 penetrates into outer abradable seal 66 to rub depth $D_R$. Rub depth $D_R$ is less than seal height H of outer abradable seal 66, and the difference is clearance depth $D_C$. In the illustrated embodiment, clearance depth $D_C$ is at least the same value as radius of curvature R because that is the height at which each wall 84 is narrowed to the nominal width W from joint 88 (all shown in FIG. 3A). Even with this limitation, the minimum value of clearance depth $D_C$ is still smaller than the height that the brazing material would occupy in a traditional honeycomb seal.

The components and configuration of the sealing arrangement as shown in FIG. 4 allow for the flow of cooling air $A_C$ to be inhibited by outer abradable seal 66 and knife 82. Because outer abradable seal 66 is additively manufactured instead of brazed, clearance depth $D_C$ can be smaller so that more of seal height H can be used for pathway 90 (and rub depth $D_R$) than is possible with traditional brazed construction. This allows for a shorter overall seal height H for the same rub depth $D_R$.

Figure 5:
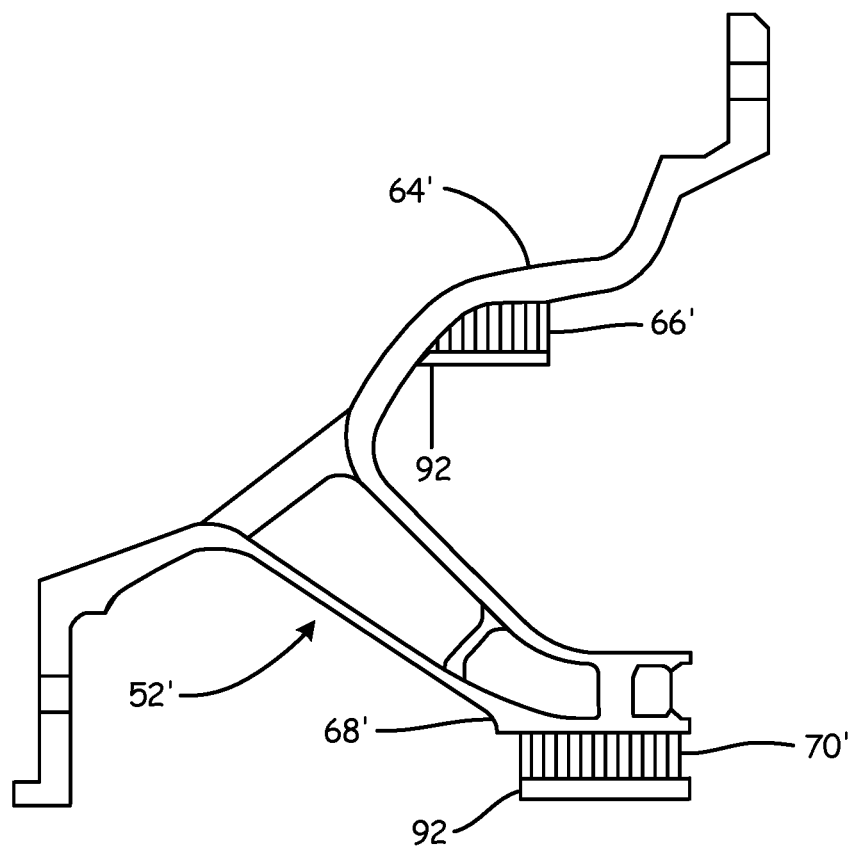
FIG. 5 is a cross-sectional view of an alternate embodiment tangential on-board injection unit with abradable seals that includes protective structures.

FIG. 5 is a cross-sectional view of an alternate embodiment TOBI 52' with outer abradable seal 66' and inner abradable seal 70' each including a protective structure 92. Protective structures 92 are annular members that are formed integrally to the inner ends of abradable seals 66', 70'. Protective structures 92 prevent damage to the relatively fragile abradable seals 66', 70' after TOBI 52' has been built by additive manufacturing. Protective structures 92 can be beneficial because there can be post-building modifications necessary in order to finish TOBI 52', such as, for example, surface finishing, machining, or grinding on at least portions of TOBI 52'. After some or all of these post-building modifications have been completed, protective structures 92 can be removed from abradable seals 66', 70', for example, by machining or grinding.

In the illustrated embodiment, outer abradable seal 66' connects directly to the body of TOBI 52' at sealing portion 64'. TOBI 52' does not require sealing arm 58 (shown in FIG. 2) because outer abradable seal 66' can be formed on a partially or wholly angled sealing portion 64'. Such an arrangement is in contrast to a brazed abradable seal, which would be attached to a sealing portion that has been machined to extend parallel to longitudinal engine centerline axis $C_L$ (shown in FIG. 1). Furthermore, because abradable seals 66', 70' are formed directly onto sealing portions 64', 68', respectively, the excess material that would be machined off to form traditional sealing portions for brazed abradable seals are not necessary to include in the first instance.

The components and configuration of TOBI 52' as shown in FIG. 5 allow for abradable seals 66', 70' to be protected during post-building processing. In addition, TOBI 52' can be lighter due to the absence of sealing arm 58 and less expensive due to the lack of extra material and machine-time required to form the sealing portions.

Figure 6:
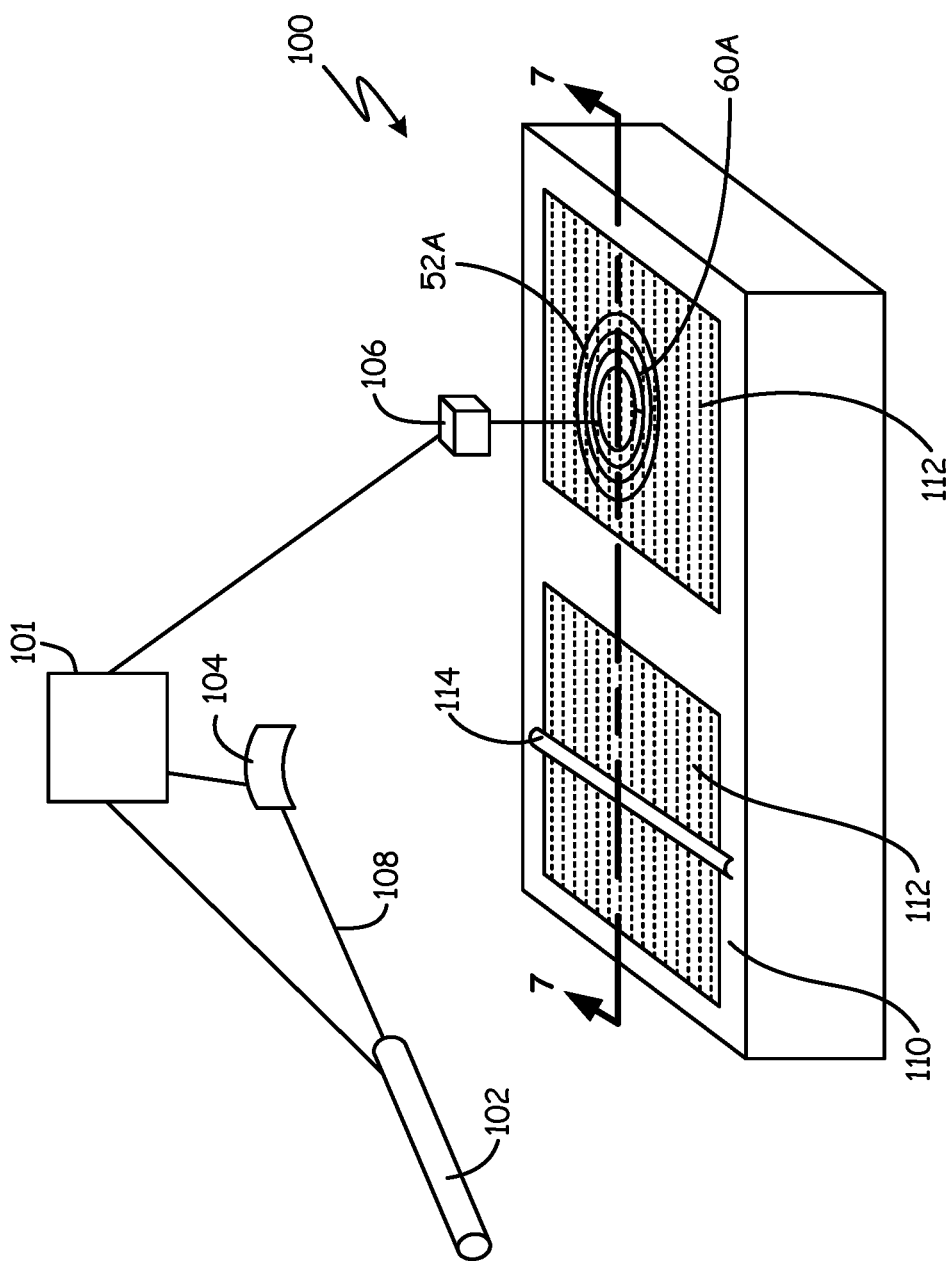
FIG. 6 is a perspective view of an additive manufacturing apparatus.

FIG. 6 is a perspective view of additive manufacturing apparatus 100. In particular, FIG. 6 shows an additive manufacturing apparatus which uses laser additive manufacturing to create a three-dimensional object out of sinterable, pulverulent material. While direct metal laser sintering (DMLS) is described, other additive manufacturing techniques may be employed, such as, for example, laser powder bed fusion, electron beam powder bed fusion, laser powder deposition, electron beam wire, and selective laser sintering.

Additive manufacturing apparatus 100 includes computer 101 and a set of optical components, including laser 102, mirror 104, and moving optical head 106, which guide laser beam 108 according to the instructions from computer 101. Laser 102 may be any source of heating radiation, such as a $CO_2$ laser. Additive manufacturing apparatus 100 also includes frame 110, pulverulent material 112, and coater 114, which are used for powder containment and application. Pulverulent material 112 may be any material suitable for use as a TOBI. Typically, pulverulent material 112 will be some combination of ceramic and/or metal. For example, pulverulent material 112 may be steel, stainless steel, or a high temperature superalloy. Coater 114 is arranged along a surface of frame 110, and may be moved across the surface of frame 110. Coater 114 may be, for example, a knife blade or a roller. As shown in FIG. 6, partially built TOBI 52A is present inside frame 110.

A user creates a computer file for computer 101 that defines a component with particular features, such as TOBI 52 (shown in FIG. 2), in layers (that can be of different thicknesses). Computer 101 then controls the optical equipment to create the component. Laser 102 creates laser beam 108 which can be used for melting, sintering, or cutting. Laser 102 is pointed towards mirror 104, which is arranged to deflect laser beam 108 toward moving optical head 106. Generally, moving optical head 106 directs laser beam 108 towards areas within frame 110, which holds pulverulent material 112. Generally, the areas melted or sintered form a layer of TOBI 52. In FIG. 6, partially built TOBI 52A is shown being built up on a layer-by-layer basis. Areas adjacent to partially built TOBI 52A can remain unmelted or unsintered to form gaps between walls 84 (shown in FIGS. 3A-3B).

After each layer of partially built TOBI 52A is finished, the support holding partially built TOBI 52A (shown later in FIG. 7) is lowered by the thickness of one layer of pulverulent material 112, and additional pulverulent material 112 is added on top of the existing structures using coater 114. Then new layer of pulverulent material 112 is melted or sintered to the top of partially built TOBI 52A, and the process is repeated. By repeating the process several times, a layer-by-layer object, such as a complete TOBI 52 including abradable seals 66, 70 (shown in FIG. 2) may be manufactured.

Figure 7:
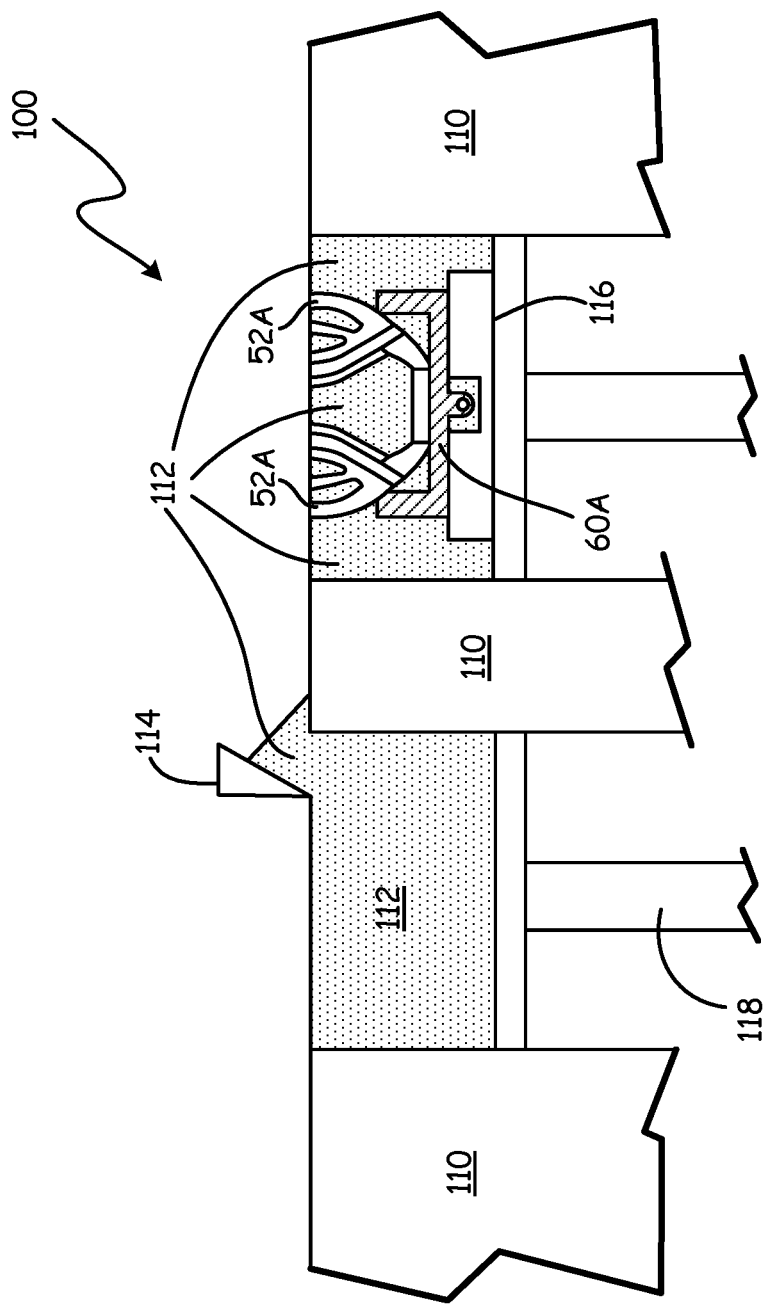
FIG. 7 is a cross section view of the additive manufacturing apparatus along line 7-7 in FIG. 6.

FIG. 7 is a cross section view of additive manufacturing apparatus 100 along line 7-7 in FIG. 6. FIG. 7 is a cutaway view that shows the operation of additive manufacturing apparatus 100. FIG. 7 shows a DMLS apparatus, but it will be understood by those skilled in the art that other additive manufacturing techniques and apparatuses may be used, such as, for example, laser powder bed fusion, electron beam powder bed fusion, laser powder deposition, electron beam wire, and selective laser sintering.

Additive manufacturing apparatus 100 as shown in FIG. 7 includes many of the same parts as those shown in FIG. 6, such as frame 110, pulverulent material 112, coater 114, and partially built TOBI 52A. FIG. 7 also shows component support 116 and material supply support 118. Component support 116 may be used to raise or lower partially built TOBI 52A. Material supply support 118 may be raised to elevate or lower pulverulent material 112 above the working surface of frame 110.

FIG. 7 shows the arrangement of component support 116 and material supply support 118 in addition to the arrangement of parts shown in FIG. 6. As can be seen in FIG. 7, partially built TOBI 52A rests on component support 116. Likewise, pulverulent material 112 rests on material supply support 118.

As each layer of partially built TOBI 52A is melted or sintered, component support 116 is lowered and material supply support 118 is raised. Coater 114 scrapes a layer of pulverulent material 112 off of the top of the supply side and applies it in a layer across the top of partially built TOBI 52A. The process is then repeated until TOBI 52 (shown in FIG. 2) is complete.

FIGS. 6-7 show one possible way of additively manufacturing TOBI 52 with abradable seals 66, 70 as disclosed above in reference to FIGS. 2-5. Alternative methods for additively manufacturing components are possible. For example, laser powder bed fusion, electron beam powder bed fusion, laser powder deposition, electron beam wire, or selective laser sintering may be used to create objects in an additive fashion.

It should be recognized that the present invention provides numerous benefits and advantages. For example, an additively manufactured TOBI is faster to manufacture because the abradable seals and their attachment locations do not require many or any post-building modifications. In addition, the attachment of the walls of the abradable seals is uniform and consistent, which allows for a deeper rub depth of the knife edge seals. This reduces the height requirement of the abradable seals, which reduces weight and cost. A protective layer can also be temporarily implemented to prevent damage to the abradable seals during construction.

Discussion of Possible Embodiments

The following are non-exclusive descriptions of possible embodiments of the present invention.

A method of making a component, the method according to an exemplary embodiment of this disclosure, among other possible things includes: creating a computer file defining the component in layers, the component comprising: a body including a sealing portion; and an abradable seal extending from the sealing portion; and building the component using an additive manufacturing process that builds the component on a layer-by-layer basis such that the abradable seal is integral to the body.

The method of the preceding paragraph can optionally include, additionally and/or alternatively, any one or more of the following features, configurations and/or additional components:

A further embodiment of the foregoing method, wherein building the component can comprise: building a tangential on-board injector including a plurality of vanes configured to be incorporated into a gas turbine engine.

A further embodiment of any of the foregoing methods, wherein building the component can comprise: building a plurality of walls to form the abradable seal.

A further embodiment of any of the foregoing methods, wherein building the component can comprise: building a plurality of walls arranged to form a plurality of hexagonal cells to form the abradable seal.

A further embodiment of any of the foregoing methods, wherein building the component can comprise: building a plurality of walls with a plurality of joints with the body at the sealing portion, wherein each joint is uniform.

A further embodiment of any of the foregoing methods, wherein building the component can comprise: building each of the plurality of joints with a radiused shape.

A further embodiment of any of the foregoing methods, wherein building the component can comprise: building a protective layer on the abradable seal; modifying the component after building the component; and removing the protective layer from the abradable seal after the component has been modified.

A further embodiment of any of the foregoing methods, wherein the abradable seal can be configured to interact with a knife edge seal that travels through a pathway in the abradable seal.

A monolithic component having a first end and a second end according to an exemplary embodiment of this disclosure, among other possible things includes: a body including a sealing portion; and an abradable seal integral to and extending from the sealing portion; the component being made by the steps of: selectively sintering a first layer of pulverulent material within a frame to make a partially built component; lowering the partially built component; adding a second layer of pulverulent material on top of the partially built component; and selectively sintering the second layer of pulverulent material to the partially built component.

The component of the preceding paragraph can optionally include, additionally and/or alternatively, any one or more of the following features, configurations and/or additional components:

A further embodiment of the foregoing component, wherein the component can be a tangential on-board injector including a plurality of vanes configured to be incorporated into a gas turbine engine.

A further embodiment of any of the foregoing components, wherein the abradable seal can be comprised of a plurality of walls.

A further embodiment of any of the foregoing components, wherein the plurality of walls can be arranged to form a plurality of hexagonal cells.

A further embodiment of any of the foregoing components, wherein each joint between each of the plurality of walls and the body can be uniform.

A further embodiment of any of the foregoing components, wherein each joint between each of the plurality of walls and the body can be filleted.

A further embodiment of any of the foregoing components, wherein the abradable seal can be built with a protective layer, and wherein the component can be made by the further steps of: modifying the component after building the component; and removing the protective layer from the abradable seal after the component has been modified.

A component according to an exemplary embodiment of this disclosure, among other possible things includes: a body including a sealing portion; and an abradable seal extending from the sealing portion, the abradable seal having a plurality of walls; wherein the abradable seal is comprised of the same material as the body and is integral to the body; and wherein each joint between each of the plurality of walls and the body is uniform.

The component of the preceding paragraph can optionally include, additionally and/or alternatively, any one or more of the following features, configurations and/or additional components:

A further embodiment of the foregoing component, wherein the component can be a tangential on-board injector including a plurality of vanes configured to be incorporated into a gas turbine engine.

A further embodiment of any of the foregoing components, wherein each joint between each of the plurality of walls and the body can be filleted.

A further embodiment of any of the foregoing components, wherein the component can further comprise: a protective layer that covers the abradable seal.

A further embodiment of any of the foregoing components, wherein the protective layer can extend from at least one of the plurality of walls.

A further embodiment of any of the foregoing components, wherein the abradable seal can comprise a pathway that is configured to allow a knife edge seal to travel through the abradable seal.

A sealing arrangement for a gas turbine engine according to an exemplary embodiment of this disclosure, among other possible things includes: a stationary component; a rotating component; an abradable component attached to the stationary component, the abradable seal having a seal height; and a contacting attached to the rotating component; wherein the knife edge seal penetrates into the abradable seal by a rub depth; and wherein each joint between each of the plurality of walls and the body is uniform.

The sealing arrangement of the preceding paragraph can optionally include, additionally and/or alternatively, any one or more of the following features, configurations and/or additional components:

A further embodiment of the foregoing sealing arrangement, wherein the stationary component can be a tangential on-board injector and the rotating component can be a rotor disk.

A further embodiment of any of the foregoing sealing arrangements, wherein the abradable component can be comprised of a plurality of walls.

A further embodiment of any of the foregoing sealing arrangements, wherein the plurality of walls can be arranged to form a plurality of hexagonal cells.

A further embodiment of any of the foregoing sealing arrangements, wherein each joint between each of the plurality of walls and the stationary component is uniform.

A further embodiment of any of the foregoing sealing arrangements, wherein each joint between each of the plurality of walls and the body can be filleted.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a gas turbine engine component, the method comprising: creating a computer file defining the component in layers, the component comprising: a body including a sealing portion; an abradable seal extending from the sealing portion; and building the component using an additive manufacturing process that builds the component on a layer-by-layer basis such that the abradable seal is integral to the body; wherein building the component comprises: forming, in a layer-by-layer fashion, an annular protective structure on a side of the abradable seal opposite the sealing portion; modifying the component after forming the protective structure; and finishing the component by removing the protective structure from the abradable seal after the component has been modified.

2. The method of claim 1, wherein building the component is a tangential on-board injector including a plurality of vanes configured to be incorporated into a gas turbine engine.

3. The method of claim 1, wherein the removing step includes a machining or grinding technique.

4. The method of claim 1, wherein the abradable seal is configured to interact with a knife edge seal that travels through a pathway in the abradable seal.

5. The method of claim 1, and further comprising:
   forming, in a layer-by-layer fashion, a plurality of walls extending perpendicularly from the sealing portion.

6. The method of claim 5, and further comprising:
   arranging the walls to form a plurality of hexagonal cells at least partially defining the abradable seal.

7. The method of claim 5, and further comprising:
   forming, in a layer-by-layer fashion, a plurality of joints, each extending from the sealing portion and connecting the sealing portion to one of the plurality of walls.

8. The method of claim 7, wherein each of the plurality of joints is uniform.

9. The method of claim 7, wherein each of the plurality of joints has a radiused shape.

\* \* \* \* \*